United States Patent [19]
Barnes et al.

[11] Patent Number: 5,974,372
[45] Date of Patent: Oct. 26, 1999

[54] GRAPHICAL USER INTERFACE (GUI) LANGUAGE TRANSLATOR

[75] Inventors: David H Barnes, De Soto; Bruce L Allen, Mission, both of Kans.; Daniel A Greene, Kansas City, Mo.

[73] Assignee: DST Systems, Inc., Kansas City, Mo.

[21] Appl. No.: 08/786,000

[22] Filed: Jan. 21, 1997

Related U.S. Application Data

[60] Provisional application No. 60/011,453, Feb. 12, 1996.

[51] Int. Cl.$^6$ .............................. G06F 17/28; G06F 17/21
[52] U.S. Cl. .................................. 704/8; 704/7; 707/536; 345/340; 345/347
[58] Field of Search .................................... 704/2, 3, 8, 1, 704/7; 707/536; 345/326, 329, 333, 334, 340, 347; 395/707

[56] References Cited

U.S. PATENT DOCUMENTS

| | | | |
|---|---|---|---|
| 4,615,002 | 9/1986 | Innes ............................................ | 704/8 |
| 4,870,610 | 9/1989 | Belfer .......................................... | 704/2 |
| 5,155,836 | 10/1992 | Jordan et al. ............................. | 395/500 |
| 5,243,519 | 9/1993 | Andrews et al. ........................... | 704/8 |
| 5,392,386 | 2/1995 | Chalas ...................................... | 345/335 |
| 5,475,843 | 12/1995 | Halviatti et al. ......................... | 395/704 |
| 5,581,684 | 12/1996 | Dudzik et al. ........................... | 345/338 |
| 5,583,761 | 12/1996 | Chou ....................................... | 707/536 |

OTHER PUBLICATIONS

William S. Hall: "Adapt Your Program for Worldwide Use with Windows™ Internationalization Support." *Microsoft Systems Journal*, pp. 29–45, Nov./Dec. 1991.

*Primary Examiner*—Joseph Thomas
*Attorney, Agent, or Firm*—Chase & Yakimo, L.C.

[57] ABSTRACT

A method of translating screen displays of a user application program from a first base language to a user-selectable second language. The method is driven by program software which intercepts the messages created by a presentation manager of a WINDOWS operating system, the messages being used to form screen displays of the user application program on the terminal. Initially, the untranslated text is moved from a displayed screen to a translation table. The user, who need not be a programmer or computer oriented, enters a translation of the text into the same table via the keyboard, the table then being stored in computer memory. Upon subsequent operation of the application program the message, which forms the screen to be displayed, will be intercepted. Subsequently, a search of the translation table for the text in the intercepted message is conducted. The matched text is replaced with the second language previously entered in the translation table. The translated message is then forwarded for display on the terminal screen. The method can either translate all designated application screens upon start up of the application program or can be individually translated as they appear on the terminal screen.

6 Claims, 26 Drawing Sheets

LANGUAGE DEFINITION PROGRAM - SPANISH

FILE  PHRASE  HELP

| KEY | TRANSLATION |
|---|---|
| AUTOFLAG | MARCA AUTOMATICA |
| AWD ADMINISTRATION OPTIONS OVERVIEW | RESUMEN DE LOS OPCIONES ADMINISTRATIVE |
| AWD DIRECTORIES | DIRECTORIES DE AWD |
| AWD PM ADMINISTRATION | ADMINISTRACION PM DE AWD |
| AWD TRACE SELECTION | SELECCION DE PISRT DE AWD |
| AWD OPTIONS | OPCIONES DE AWD |
| ACCOUNT | CUENTA |
| ADD | AUMENTAR |
| ADMIN OPTIONS | OPCIONES ADMINISTRATIVAS |
| ALL PRIVILEGES | TODOS PRIVILEGIOS |
| AUTO SCREEN FLAG | MARCA AUTOATICA DE PANTALLA |
| AVAILABLE | DISPONIBLE |
| BASIC WORK CSD | CSD BASICO DE TRABAJO |
| BATCH | LOTE (GRUPO) |
| BREAK RELATIONSHIP | ROMPER (SEPARAR) RELACIONES |
| BUSINESS AREA | AREA DE NEGOCIOS |

MENSAJE

USER ID LIST
AWDNLS - AWD
ADMUSER - ADR
AWDBATCH - BA
AWDNLS - AWD
DMAN - NICH
DSTDETUP - ALL P
FAXSRVR - FAX S
QRYWRHS - QUE
USERID - CLERIC

ESTADISTICAS DEL USUARIO
ULTIMA CONEXION AL: 1995-12-05-09.51.28.000000    TERM:
NUMERO DE CO: 46    NUMERO DE CONEXIONES INVALIDOS AL S
ULTIMA CAMBIO DE PALABRA DE: 1980-01-01

ATRIBUTOS DEL USUARIO
USER ID: AWDNLS    PASSWORD: *****
NOMBRE: BATCH
APELLIDO: AWD NAT'L LANGUAGE
MIDDLE:    SSN: 0 - -
IDENTIDA:    PIAS: 001 - UNITED STATES    ☑ LOTE (GRUPO)
NIVEL DE SEGURIO: 99    AREA DE NEGOCIOS
TELEFONO: (000) 000-0000    GRUPO: AWD FACIL
FACSIM: (000) 000-0000    IN BY: 00:00:01
DEPARTAME:    OUT BY: 23:59:59
FAX ID:    SELECCIONAR: 1 - STD. QUEUE

INSERTAR    ZAR (PONER)

CONFIRM TACHADUR

TACHAR

USER ID LIST
AWDNLS - AWD
ADMUSER - ADR
AWDBATCH - BA
AWDNLS - AWD
DMAN - NICH
DSTDETUP - ALL P
FAXSRVR - FAX S
QRYWRHS - QUE
USERID - CLERIC

ユーザー統計

前回のログオン 　　1995-12-05-09.51.28.000000 　　無効ログオン回数 　　期間
ログオン回数 　　46
パスワードの最終変更時 　　1980-01-01

ユーザー属性

DKDKSKA: AWDNLS 　　PASSWORD: *****
名前: BATCH
姓: AWD NAT'L LANGUAGE
MIDDLE:
推 ID: 　　SSN: 0 - - 　　☑ バッチ
安全水準: 99 　　国: 001 - UNITED STATES
電話番号: (000) 000-0000 　　業務範囲:
ファックス: (000) 000-0000 　　グループ: AWD FACIL
ファックス所 　　IN BY: 00:00:01
FAX ID: 　　OUT BY: 23:59:59
　　業務選択: 1 - STD. QUEUE

挿入 　　最新情報

√ 確認名削除

削除

USER STATUS

MESSAGE

ADM00AG

USER ID LIST
- AWDNLS - AWD
- ADMUSER - ADR
- AWDBATCH - BA
- AWDNLS - AWD
- DMAN - NICH
- DSTDETUP - ALL P
- FAXSRVR - FAX S
- QRYWRHS - QUE
- USERID - CLERIC

STATUS
- ⦿ AVAILABLE
- ○ UNAVAILABLE
- ○ SICK
- ○ VACATION
- ○ DISABLED
- FORWARD TO QUEUE: ☐

[UPDATE] [CLOSE] [HELP]

| USER STATUS | ADM00AG |
|---|---|

MENSAJE

USER ID LIST

AWDNLS - AWD
ADMUSER - ADR
AWDBATCH - BA
AWDNLS - AWD
DMAN - NICH
DSTDETUP - ALL P
FAXSRVR - FAX S
QRYWRHS - QUE
USERID - CLERIC

ESTADO
⦿ DISPONIBLE
◯ NO DISPONIBLE
◯ ENFERMO (A)
◯ VACACIONES
◯ DESACTIVAR
FORWARD TO
QUEUE:

ZAR (PONE    CERRAR    AYUDA

GRAPHICAL USER INTERFACE (GUI) LANGUAGE TRANSLATOR

CROSS REFERENCE TO RELATED APPLICATION

This application claims the benefit of the prior filed co-pending provisional application, Ser. No. 60/011,453, filed Feb. 12, 1996, entitled GRAPHICAL USER INTERFACE (GUI) LANGUAGE TRANSLATOR.

BACKGROUND OF THE INVENTION

This invention relates to the translation of screen displays of a software application program and, more particularly, to a method for translating screen displays of an application program from its base language into one or more foreign languages.

Many software application programs are intended for use in a global economy, particularly in a network environment, the network users being located throughout the world. In order to enhance the marketability of the software programs and to enable the foreign users of the program to efficiently interact, the graphical interfaces/screen displays of the program may need to appear in the language of the foreign user. Various methods have been proposed for translating programs. However, such methods can be expensive and time consuming ones as it may be necessary to change the code of the software program. Moreover, such modifications may not be feasible, as the user may not have access to the program code.

Thus, it is desirable to have a tool which enables the user to translate the graphical interfaces/screen displays of a software program without the need to modify or otherwise interact with the program code.

In response thereto we provide a method for translating the graphical user interface/screen displays without modification to the underlying application program. Our method enables the user to select screen displays for translation, gather the original text from the screen display, enter the equivalent foreign language and store the associated basic and foreign texts in memory for subsequent recall and use. The gathered text can be translated by one without program experience. Moreover, selectable words from selectable screen displays as well as selectable sub-screen displays associated therewith can be translated. Accordingly, one or more screen displays in the software program can be translated into one or more foreign languages according to the desires of the program user.

It is therefore a general object of this invention to provide a method for translating the text of screen displays of a software application program from its source code language to at least one foreign language.

Another object of this invention is to provide a method, as aforesaid, which enables the user to select the screen displays and words therein of the software program for translation.

Still another object of this invention is to provide a method, as aforesaid, which enables the software program to be automatically translated to a foreign language upon start up of the application program.

A still further object of this invention is to present a method, as aforesaid, which does not require modification of the software program.

Another further object of this invention is to provide a method, as aforesaid, which is utilized within a WINDOWS operating system environment.

Another object of this invention is to provide a method, as aforesaid, which enables translations into multiple languages.

A particular object of this invention is to provide a method, as aforesaid, which lists the text to be translated in a user friendly screen display format.

Another object of this invention is to provide a method, as aforesaid, which enables a software application program to be used by a number of persons speaking various languages.

A further object of this invention is to provide a method, as aforesaid, presented by a software program operable in a WINDOWS operating system environment.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 19 shows the scroll presented to the user with the base language translation on the left side and an equivalent target translation entered on the right side.

Figure 20:
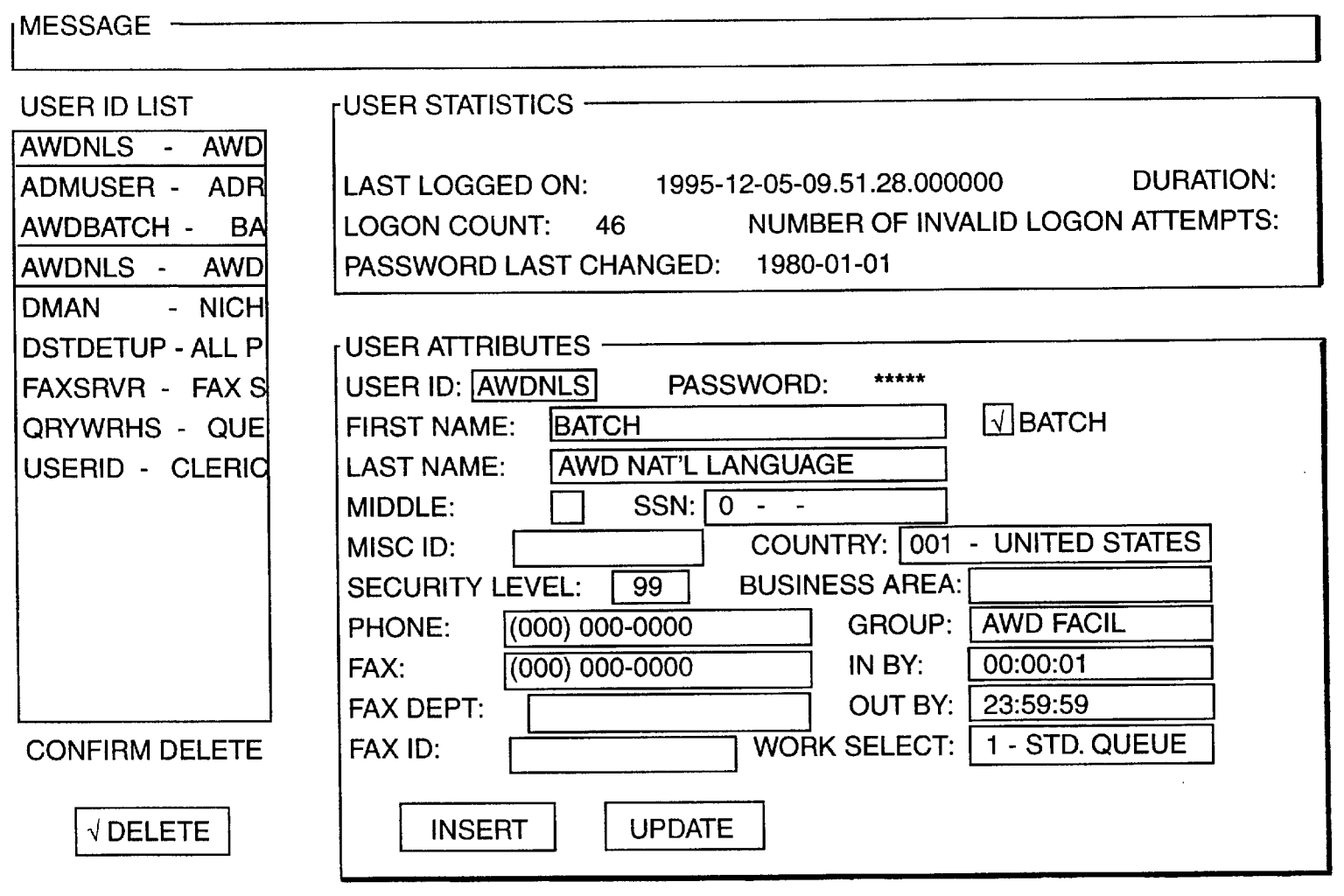

FIG. 20 shows an example display of a software application program in English.

FIG. 21 shows the screen display of FIG. 20 in Spanish.

FIG. 22 shows the screen display of FIG. 20 in Japanese.

FIG. 23 shows a sub-screen display associated with the FIG. 20 screen.

FIG. 24 shows the screen display of FIG. 23 in Spanish.

DESCRIPTION OF THE PREFERRED EMBODIMENT

Figure 1:
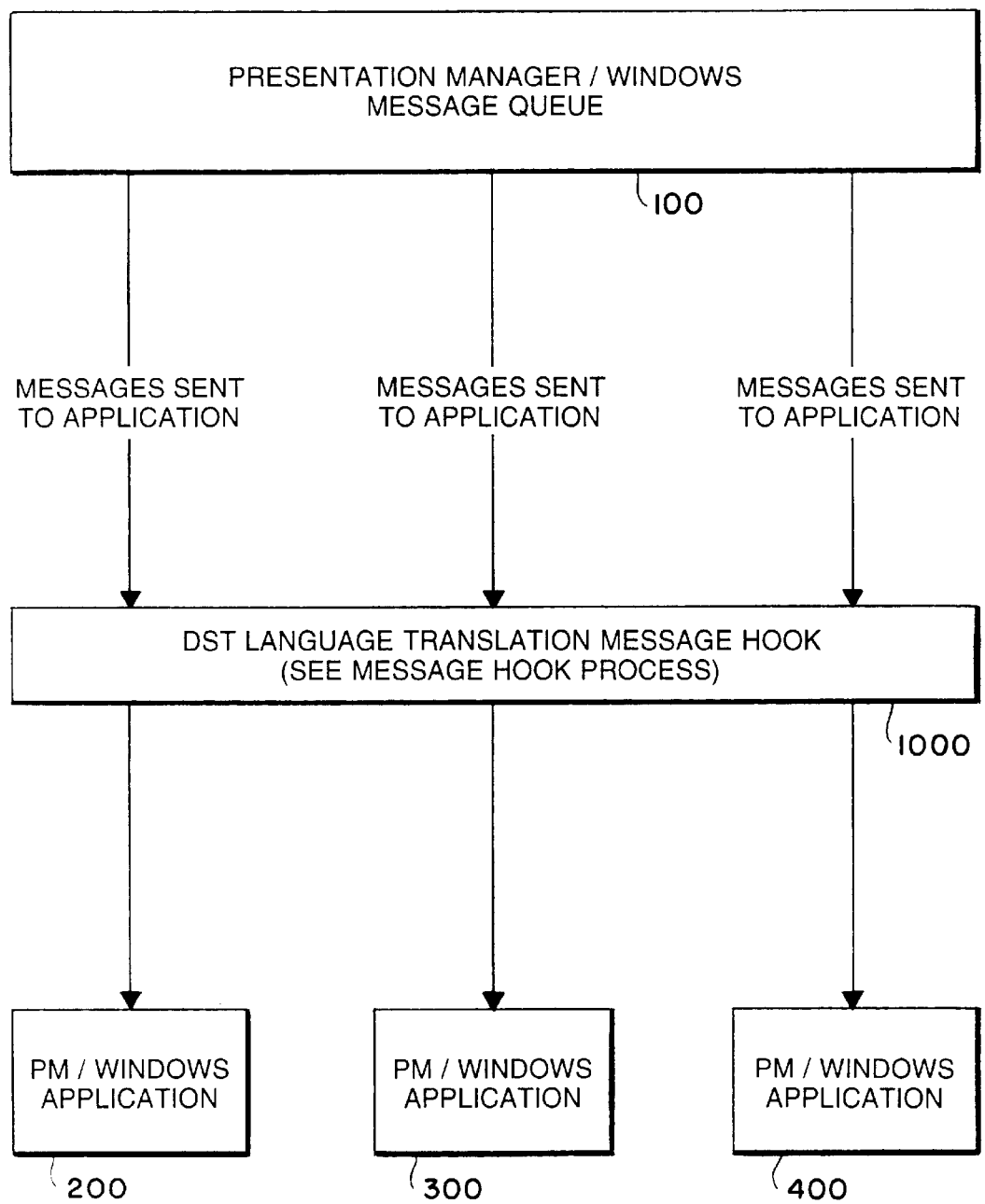
FIG. 1 is a flow diagram showing the method interposed between the message queue of a presentation manager of a WINDOWS operating system and the user application.

Turning more particularly to the drawings, our method is generally shown in FIGS. 1–12. FIG. 1 generally shows the method 1000 as intermediate a "WINDOWS operating system" message queue 100 and the software application programs 200, 300, 400. Available software offers a "WINDOWS operating system" capability which allows the user to view the screen displays of the user application programs as well as the graphical user interfaces provided by the program logic written to effect our method 1000. Thus, those skilled in the art will be able to create program logic to perform our method as hereinbelow described. Accordingly, the method 1000 may be designated herein as a translator program.

It is understood that the "WINDOWS operating system" environment includes an operating system having a presentation manager which creates messages having data therein corresponding to the screen displays of the associated software application programs. Our method utilizes these window messages of the presentation manager to effect the translation. Accordingly, the use of such messages precludes the need to interface our method with the code of the associated user application programs.

It is understood that the method is performed in a computer environment, including a computer, keyboard, display screen and mouse, the mouse enabling the user to effect commands by interface of the mouse with the screen displays either offered by the translation or application programs.

The associated user application program 200, 300, 400 may be any software program which presents various screen displays to the user, the screen having textual labels, e.g. defining the type of data associated with these labels, instructions, commands, etc. Such screen displays may have text thereon representative of certain functions which can be performed upon dragging the mouse to that command and clicking or dropping the mouse on that function. In certain cases sub-screen/overlay displays will be presented or the text of the displayed screens may change.

Initially, the user application program(s), WINDOWS operating system and the method 1000 as represented by program software are loaded into the computer, it being understood that the WINDOWS operating systems application will enable the screen displays to be simultaneously viewed on the terminal screen. The screen displays of application program(s) will initially be presented only in its host/base language, it being assumed that the base language is English. If this application program is presented to a foreign user, such as a Spanish user, an initial translation of the text in the screen displays of the application program from English to Spanish may be desired. The translator program 1000 has program logic therein which will present graphical interfaces to the user on the terminal screen. These interfaces will enable the user to gather text from selected screen displays of the user application program for translation into Spanish, or other language, as hereinbelow discussed.

Figure 13:
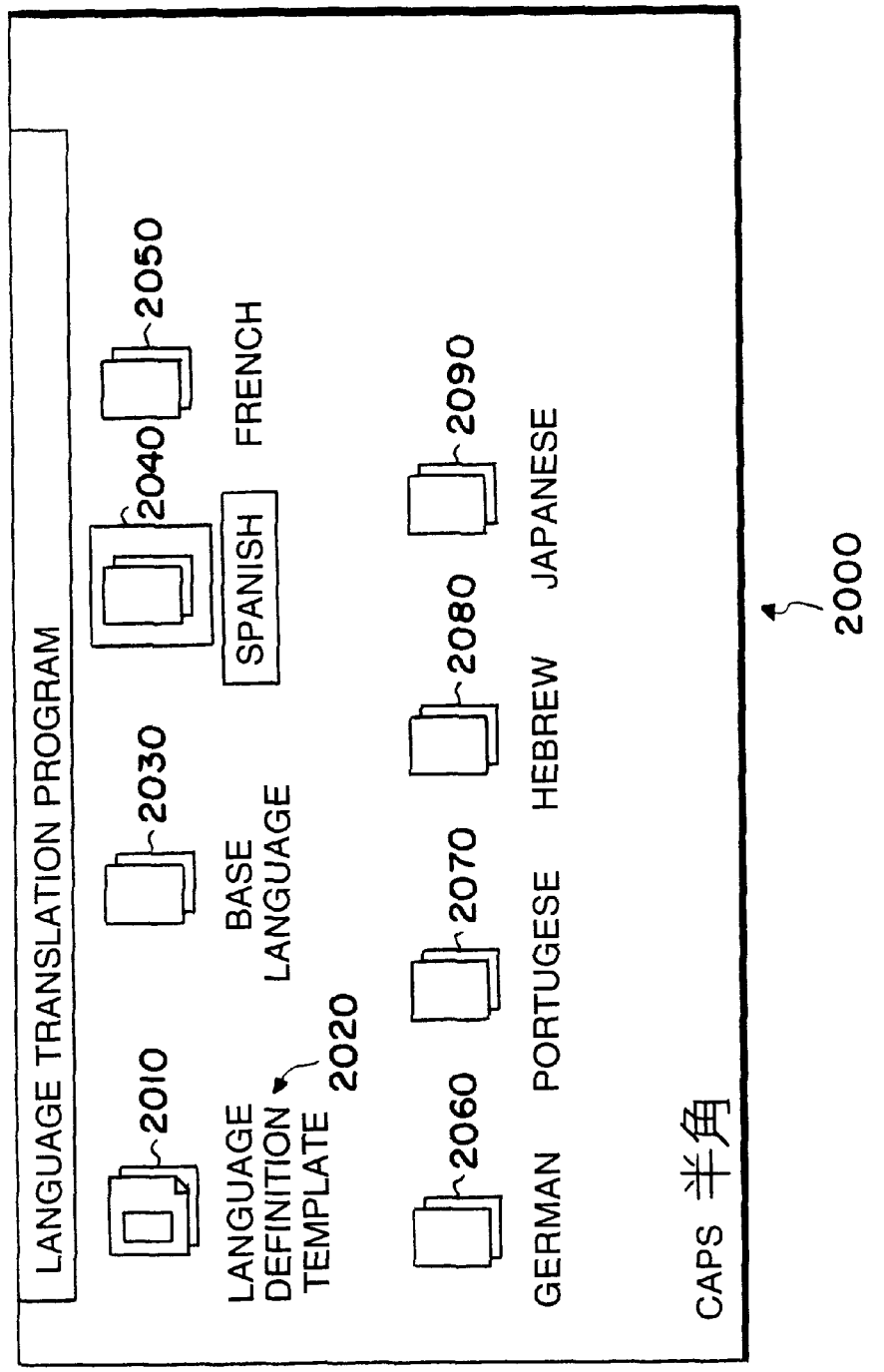
FIG. 13 shows a graphical user interface/screen display of the translation program which effects the method described herein.
Figure 16:
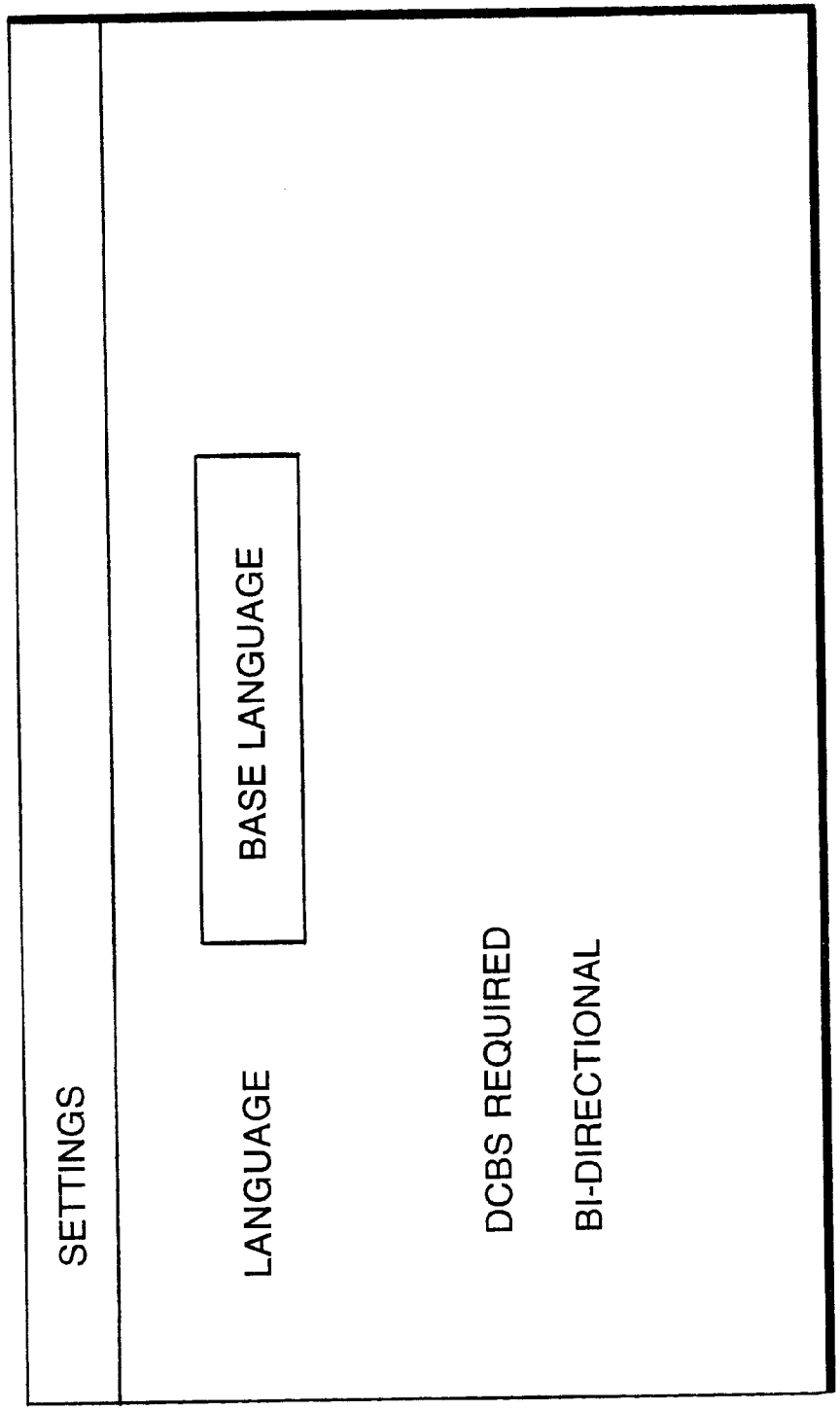
Figure 17:
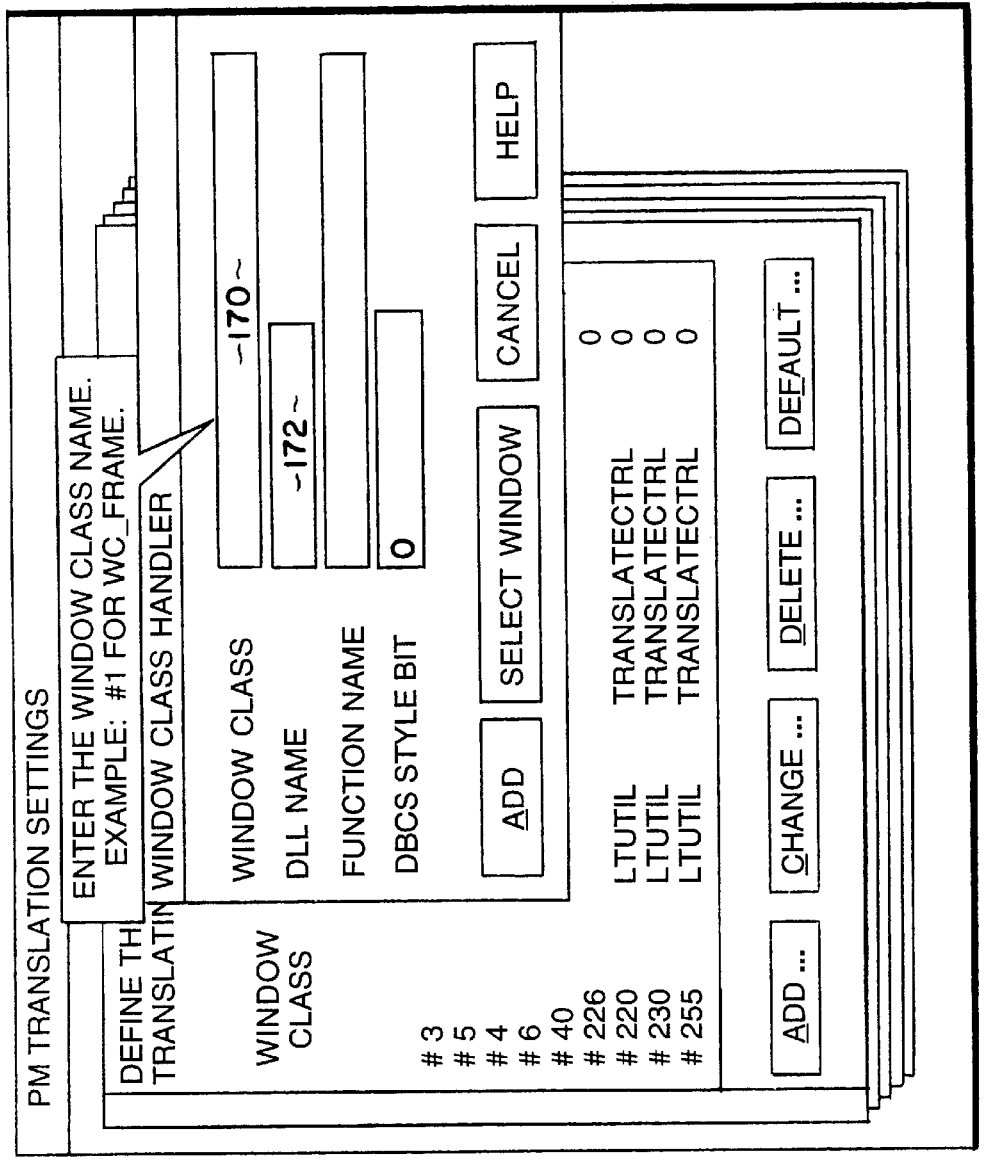
Figure 18:
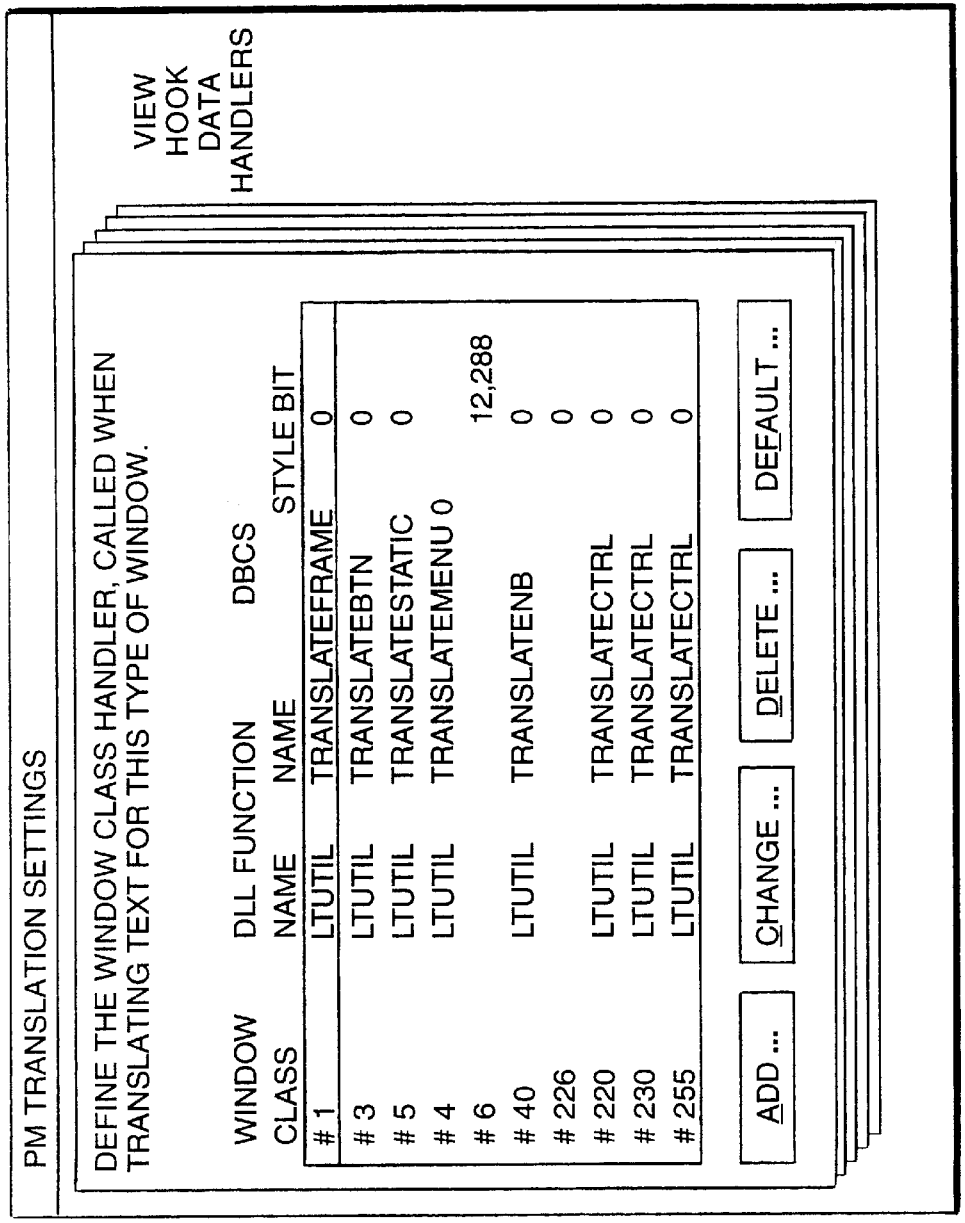
Figure 25:
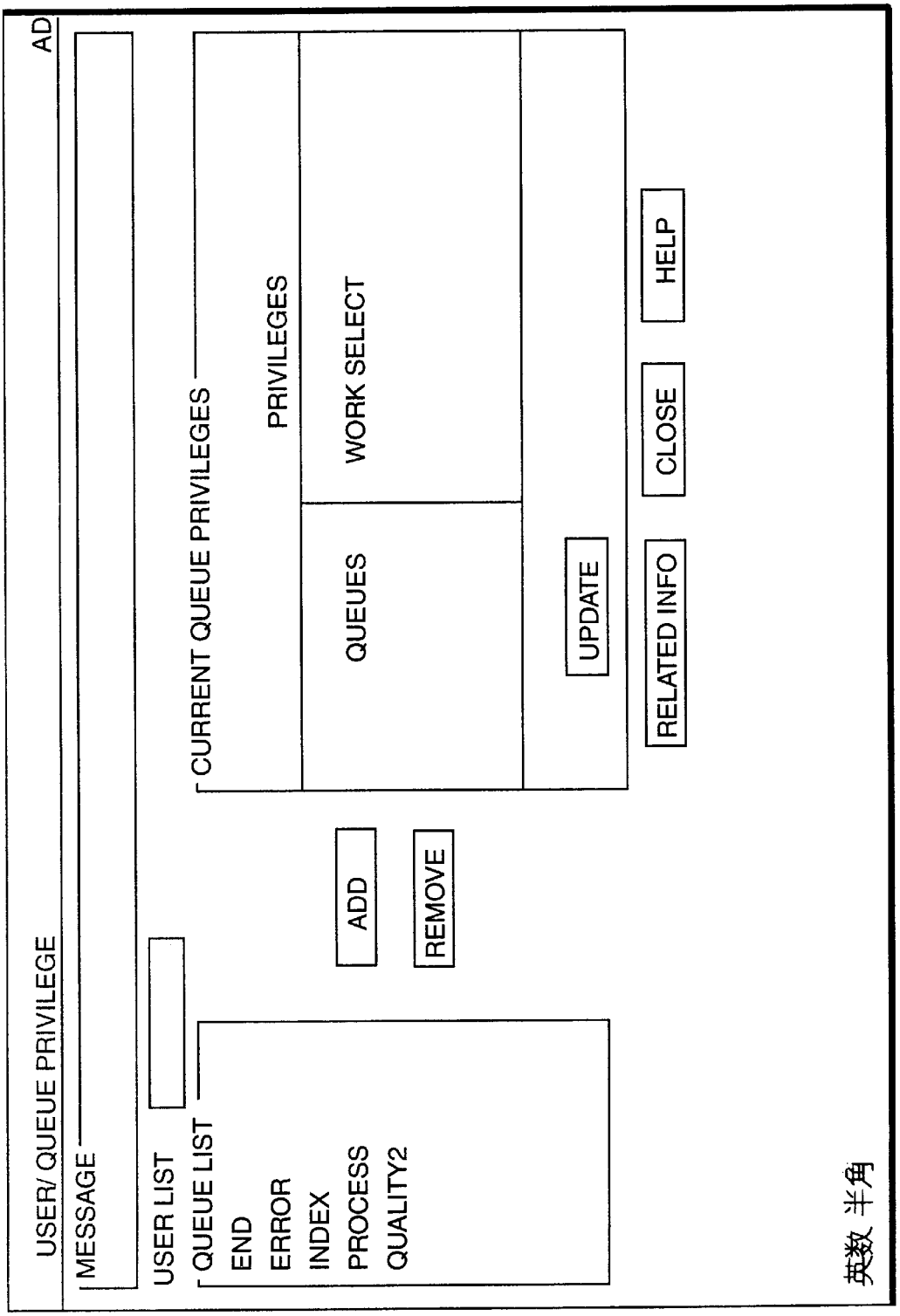
FIG. 25 shows a sub-screen of the screen of FIG. 20 in English.
Figure 26:
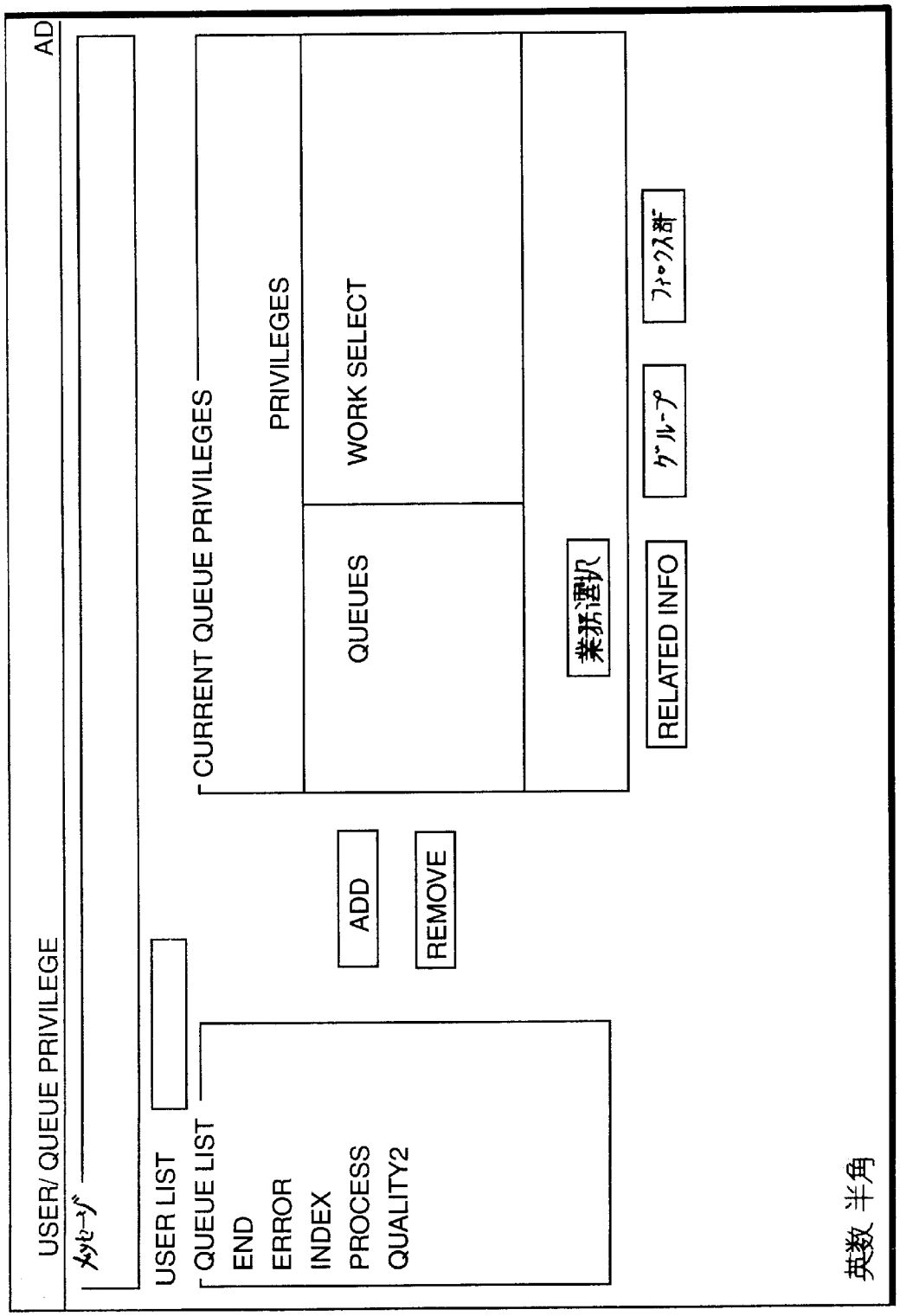
FIG. 26 shows the translation of a push button on the sub-screen of FIG. 25 into Japanese.

Upon initial start up of the translator program a language definition template screen 2000 can be displayed as shown in FIG. 13. Initially, no book ICONS will be presented on the FIG. 13 display 2000 other than the ICON 2010 inclusive of the "language definition template" text 2020 therebelow. If a foreign translation of the basic language is desired, the mouse is dragged to this ICON 2010. Upon double clicking the mouse on this ICON 2010, screen displays are presented requiring the user to enter certain data utilized by the logic of the underlying translator program 1000. These screens include the FIG. 16 screen as to whether the foreign language is a double byte language and/or a bi-directional, i.e. some foreign languages read right to left as opposed to the normal left to right read. Also, other screens will appear requiring the user to enter therein the type of language, i.e. Spanish, the name to be associated with certain fields, the location of the translation tables to be created, the type of window classifications to be used when effecting subsequent translations of screen displays (FIGS. 17–18).

Once the initial parameters desired by the translator program 1000 have been received the FIG. 19 interface can be displayed. Initially, the columns 292, 294 of scroll 296 are blank as no text has been gathered from the application screen display for translation. The user then drags the mouse from the camera ICON 298 (FIG. 19) to the primary screen display of the application program which is to be translated. Upon clicking or dropping the mouse on this application screen the translator program will extract the text from the message which forms the application screen display and list these text fields in the column 292. The equivalent Spanish translation is then entered by the user in the right column 294.

Upon completion of the displayed window, the next window to be translated in the application program is displayed with the above process being repeated. This process is repeated for every screen display in the application program that the user desires to translate. During such process the text in the left column 292 of the scroll 296 (FIG. 19) is alphabetically sorted, thus allowing for effective subsequent searching of the translation tables which are being formed.

Upon completion, ICONs in FIG. 13 entitled "BASE LANGUAGE" 2030 and "SPANISH 2040" are presented as shown in FIG. 13 are available. These ICONs are created by the program logic of the underlying translator 1000 utilizing the earlier information entered into the system by the user. Accordingly, these ICONs indicate to the user that translation tables are now available in the program 1000 memory for association with the screen displays of the user application program. This process can be repeated for other languages, book ICONs being shown in FIG. 13 for the French 2050, German 2060, Portuguese 2070, Hebrew 2080 and Japanese 2090** languages.

If the user desires that an automatic translation of all screens from the English to the Spanish language needs to be effected upon application program start up, an auto start file can be made.

Figure 14:
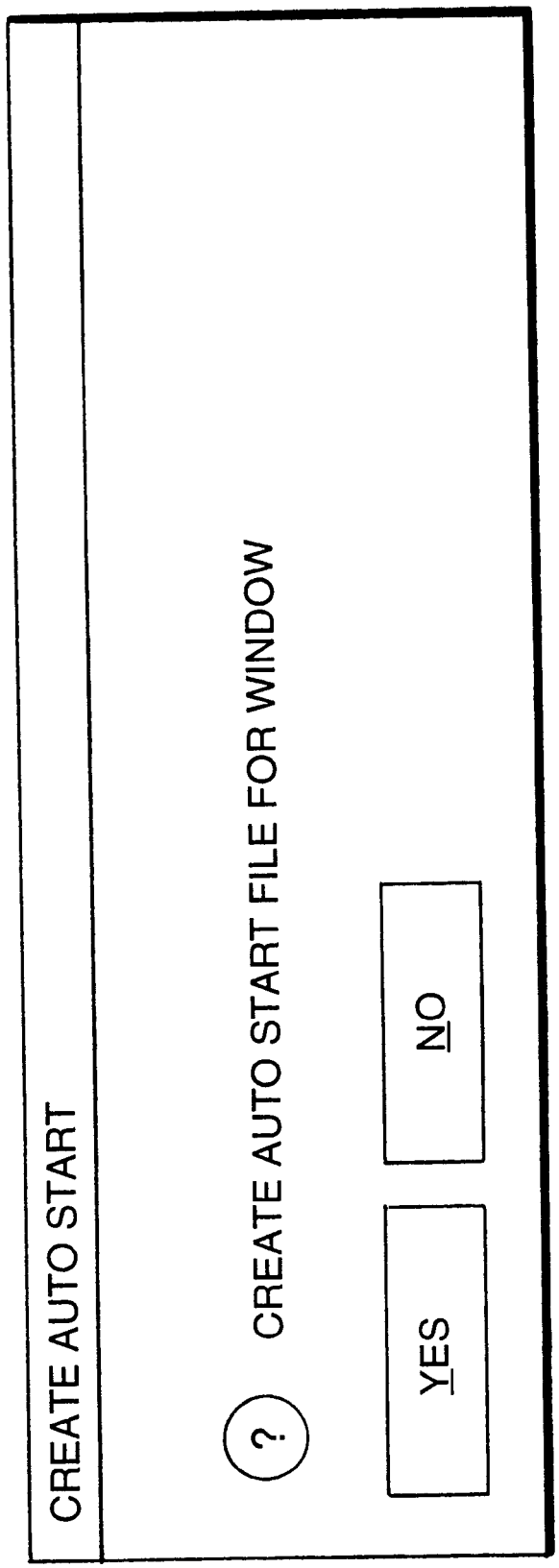
FIG. 14 shows a graphical user interface of the translation program presented for creating a permanent request which automatically transfers the language of the software program into a foreign language.
Figure 15:
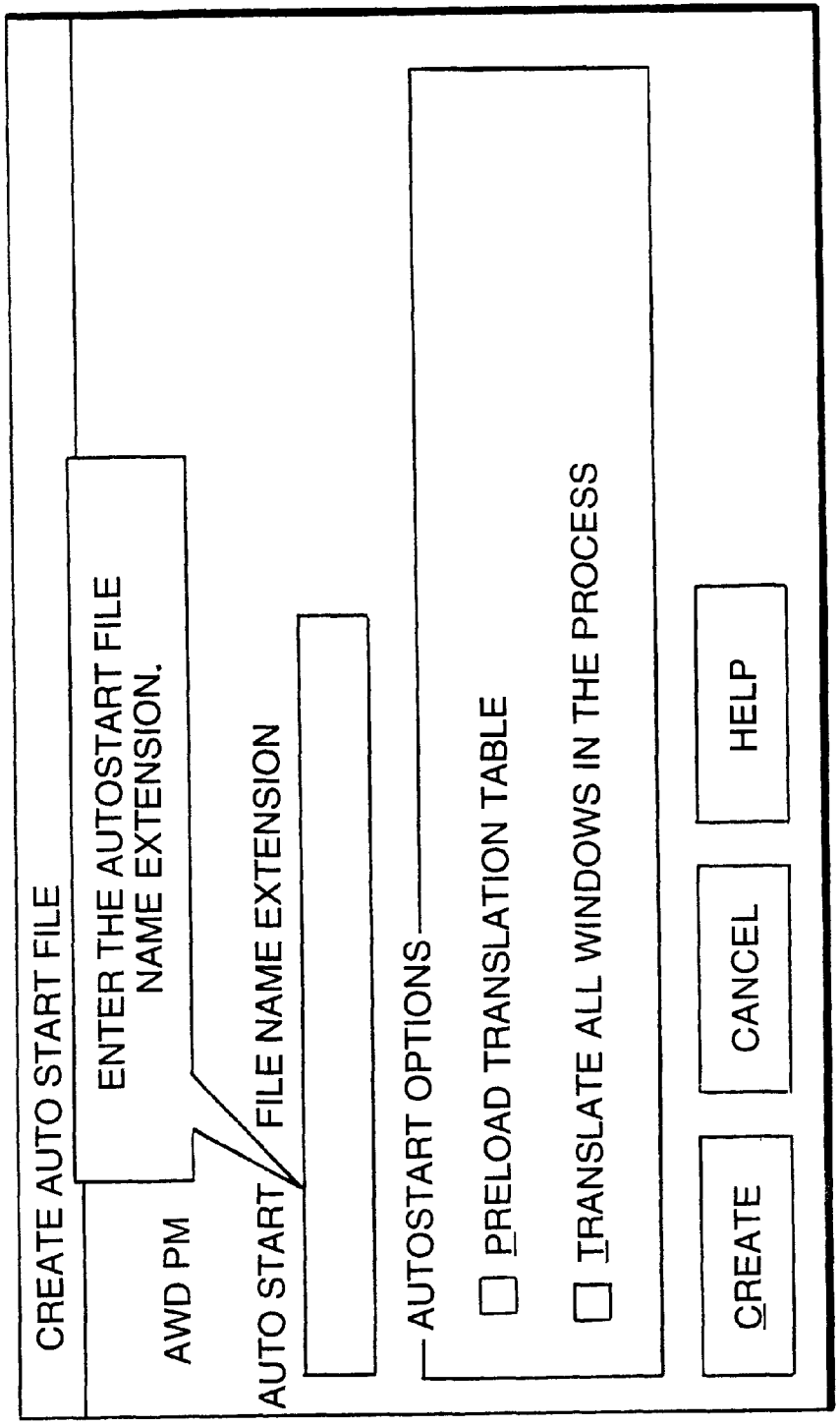
FIGS. 15–18 shows further graphical interfaces presented by use of the translation program.

To create an auto start file for the Spanish language the ALT key is first depressed. The user then drops the mouse on the Spanish book ICON 2040, depresses the control button and moves the mouse to the main or primary window of the application program. At this time the FIG. 14 screen will be displayed. Upon selecting "yes" with the mouse, the user enters an auto start file name in the FIG. 15 screen display. Auto start settings such as pre-loading the previously formed translation tables or translating all windows of the application program can also be selected in FIG. 15. At this time the previously formed translation tables and associated screen displays will be associated with the name of the user-application program and stored in permanent storage.

Accordingly, upon subsequent wake up of the application program, automatic translation of the previously translated screens of the application program will occur. If no auto start file is used the application program will remain in its base language, although the translation tables are available for use in a manner as subsequently described. A discussion of this program flow of the translation program will subsequently follow.

FIGS. 1–12 illustrate a basic flow logic of the method utilized by the translator program during automatic translation.

As shown in FIG. 1, the presentation manager of the "WINDOWS" operating system or similar operating systems forms a message queue 100, the messages therein corresponding to the screen displays of the application program by the presentation manager of the operating system. Our system utilizes the messages from the message queue 100 so as to translate the screen displays.

Figure 2:
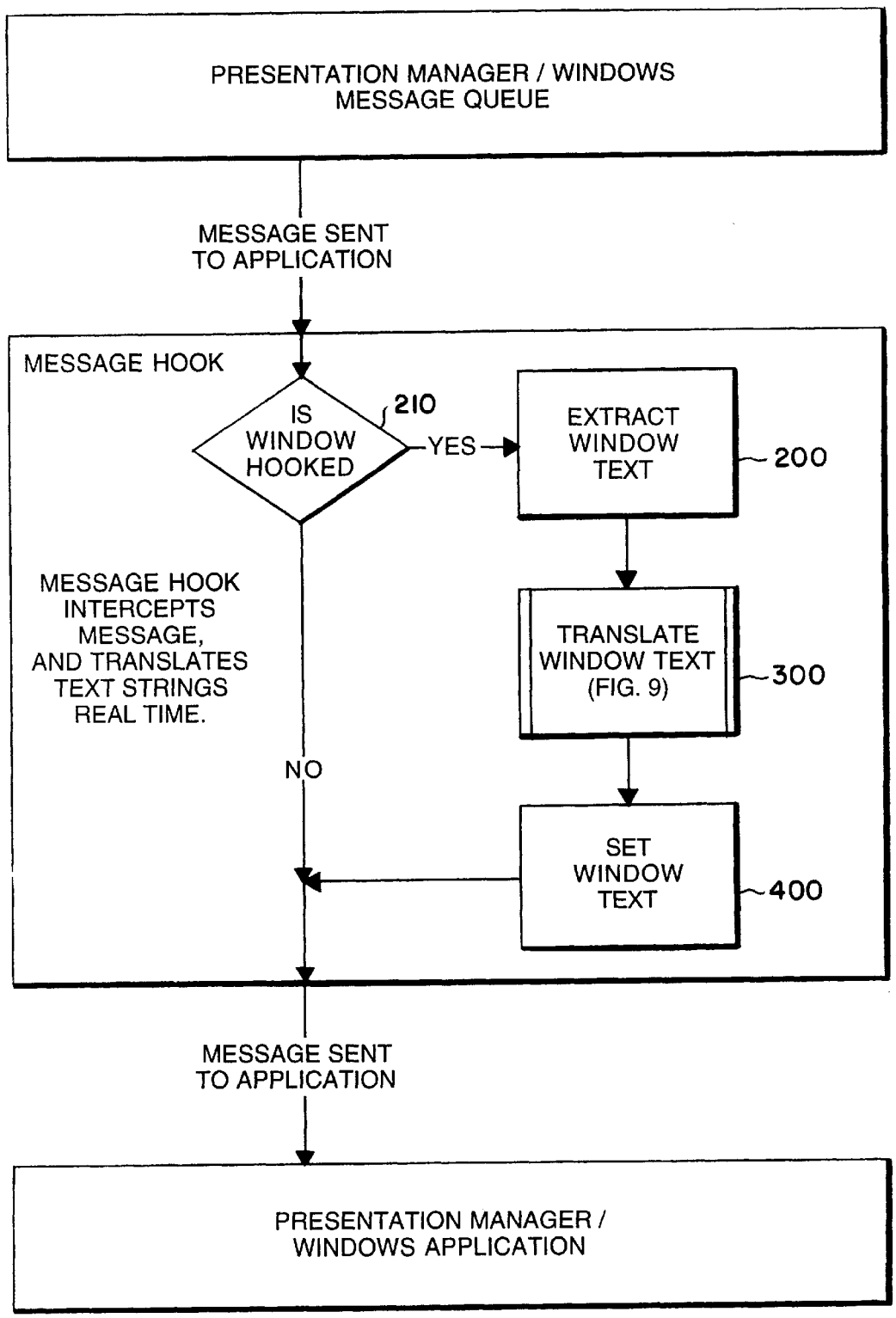
FIG. 2 is a flow diagram of FIG. 1 showing an expansion of the method of FIG. 1.

This intermediate process is further shown in FIG. 2 wherein the screen display message of the message queue of the presentation manager is interrogated. This interrogation intercepts the window/screen message prior to application delivery to see whether the screen display has been previously hooked, i.e. translated. If so, the window text is extracted from the message at 200, forwarded to a translation routine (FIG. 9) at 300 and then set at 400. The message sent to the downstream presentation manager for display includes the translated text, such message being displayed on the user's terminal in lieu of the original basic language message.

Figure 3:
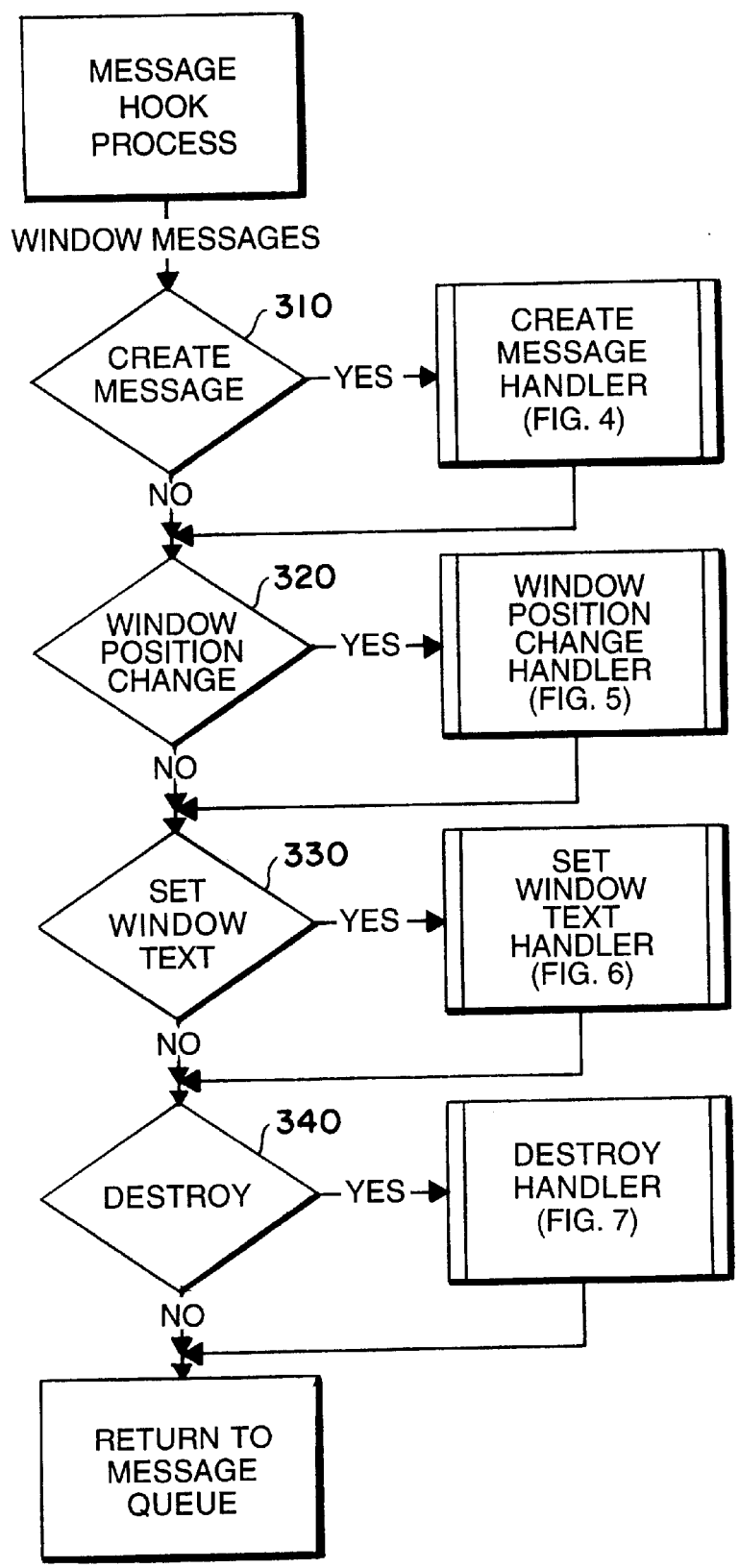
FIG. 3 is a flow diagram showing the handling of the screen messages received from the message queue of a WINDOWS operating system.

FIG. 3 shows the interrogation of window messages received from the message queue 100. A window create message 310 contains information that will enable a particular screen display to be created, the screen display corresponding to the displayed screen of the application program. A window position change message 320 enables the presentation manager to display the created window message on the terminal screen. A set window text message displays a previously created window message with text being changed. Finally, a destroy message 340 removes previously created window messages. Each of these messages is independent and will be particularly handled by the accompanying handler program logic as indicated in FIG. 3.

Figure 4:
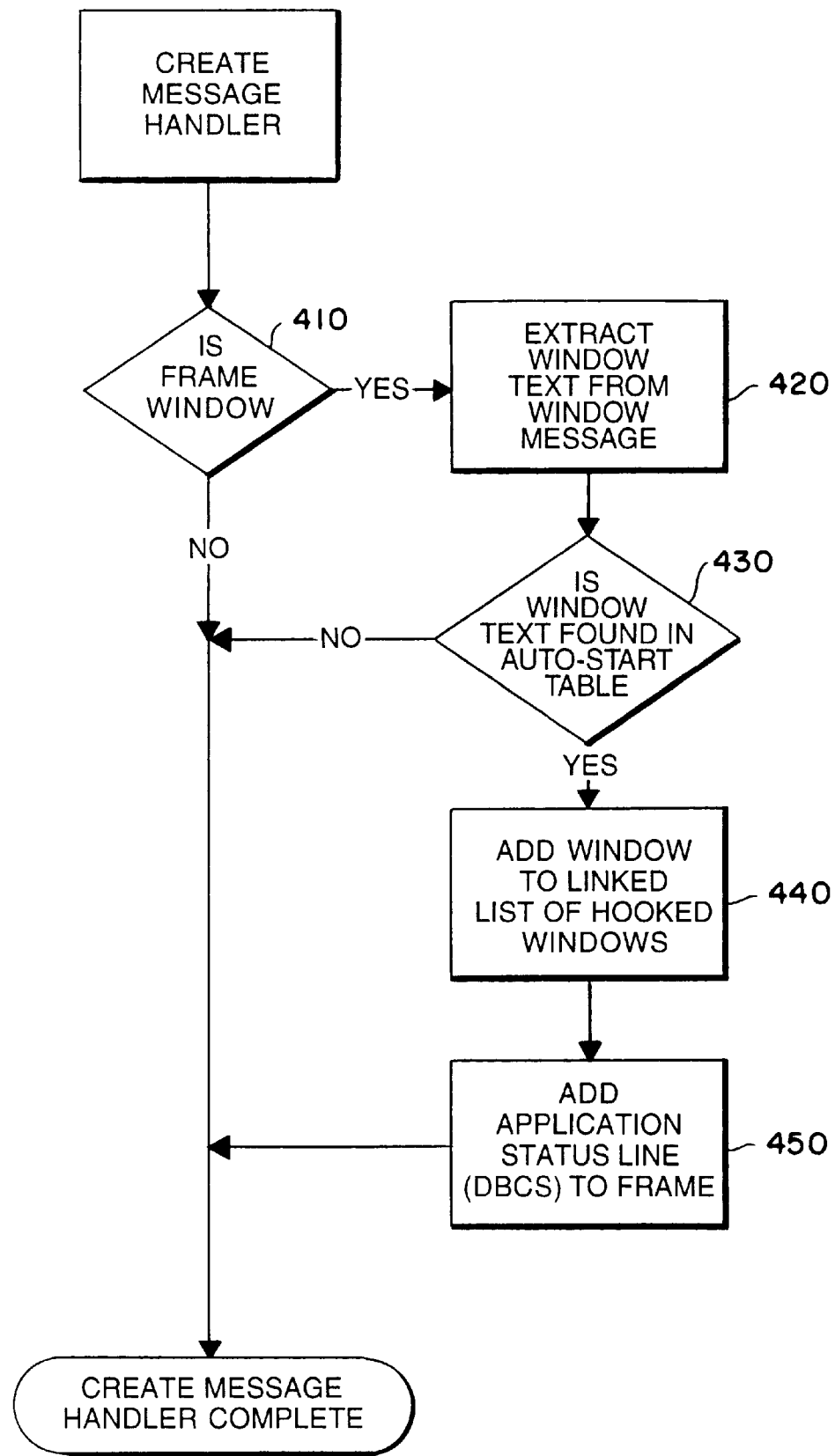
FIG. 4 is a flow diagram showing the handling of a window create message.

Receipt of a create window message causes the message to enter a create message handler routine as set forth in FIG. 4. As shown therein the logic first ascertains whether this message creates a frame window at 410, i.e. the primary window of a screen display which will have all sub or child windows and associated therewith. If so, the text is extracted from this window message at 420 and compared at 430 to the text found in the previously created auto start translation tables now permanently stored in the auto start file. If found, this window is added to an internal list of windows which has been "hooked", i.e. translated at 440. An application status line (visible on DBCS capable systems only) is then added to this window at 450, such information being previously entered upon FIG. 16 screen display. This procedure is done for each window for which a create window message is initially received, the presentation manager promulgating window create messages for each window/screen found in the application program.

Figure 5:
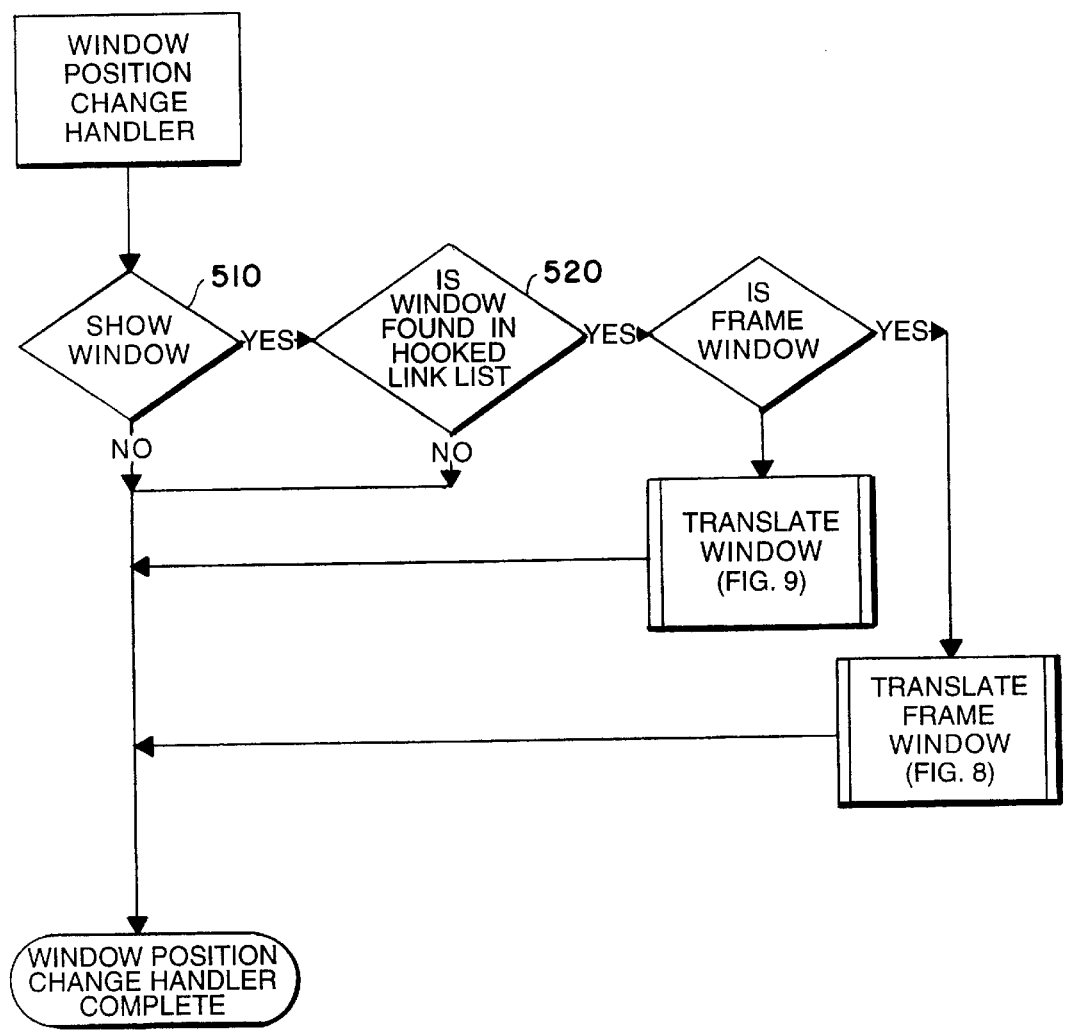
FIG. 5 is a flow diagram showing the handling of a window position change message.
Figure 8:
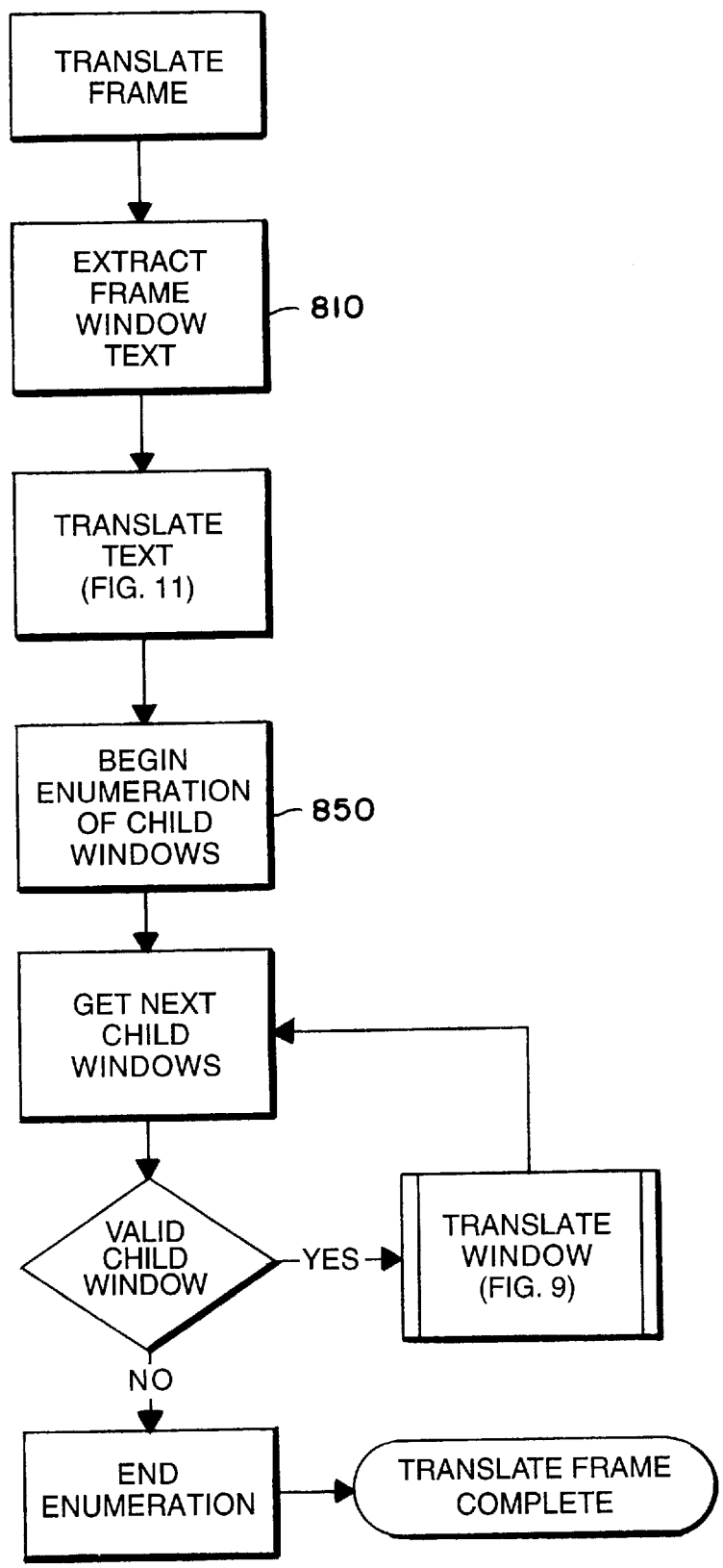
FIG. 8 is a flow diagram showing the translation of a frame window of a screen display.

Upon receipt of a window position change message at 320 (FIG. 3), i.e. the window is to be made visible on the terminal, the FIG. 5 routine is utilized. A check of the message is made at 510 and the window is again checked at 520 to see if it is in the previously created list of hooked windows (FIG. 4, 440). If so, and the window message is a frame window, translation of the frame window as shown FIG. 8 is effected. If not a frame window, a translation of the window as shown in FIG. 9 is accomplished.

FIG. 8 shows the translation of a frame window. As such the frame window text is extracted at 810. This extracted text is translated by the routine of FIG. 11 wherein the translation tables are searched at 1110. If found 1120, the text is replaced with the translation at 1150 and returned to 850. As this is a frame window each child window is checked for its validity, i.e. a classification for handling that window has been previously entered. If so, each child window is then translated as shown in FIG. 9.

Figure 9:
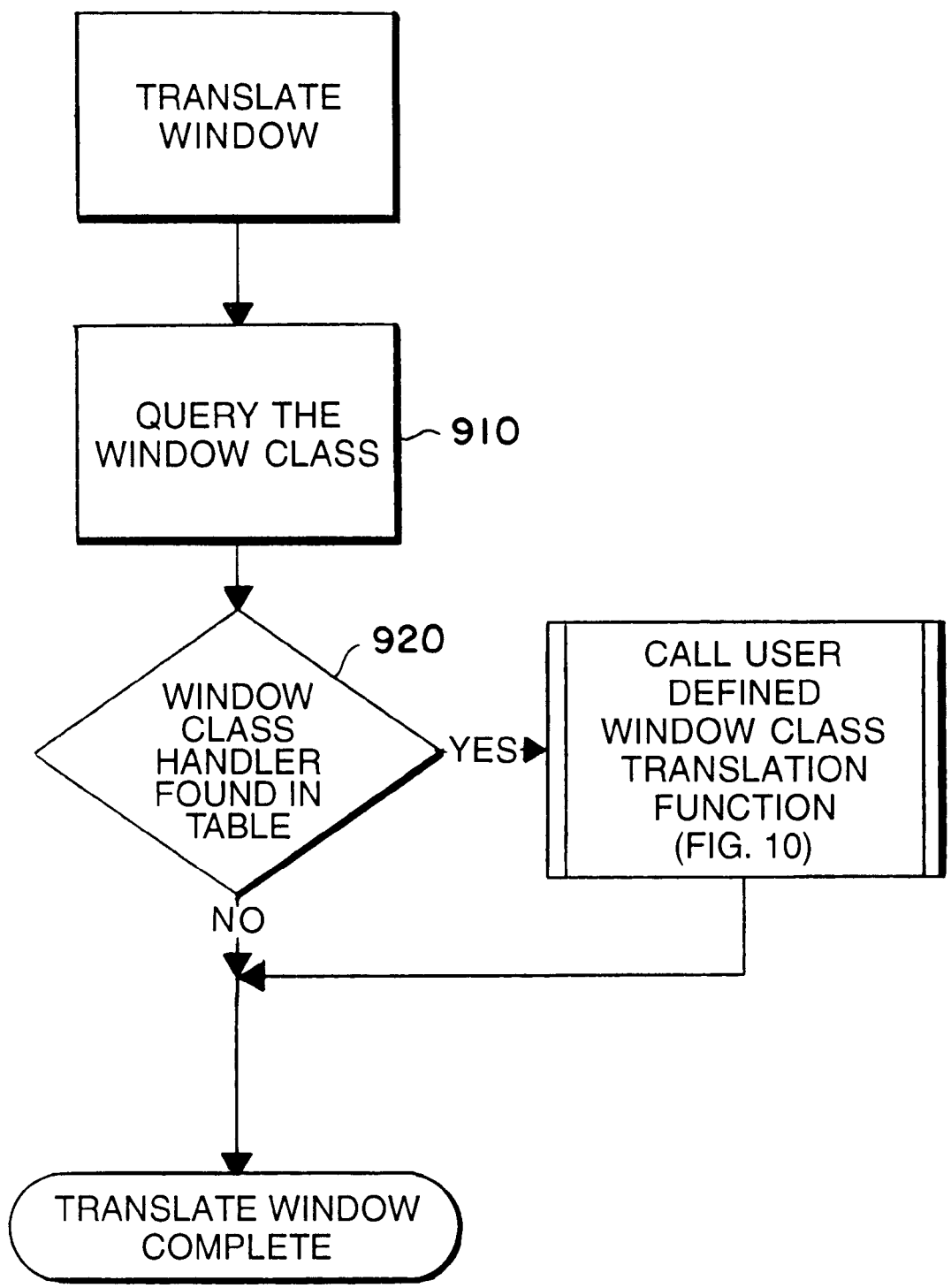
FIG. 9 is a flow diagram showing the translation of a window other than a frame window of a screen display.

As shown in FIG. 9 the window class of the child window is determined at 910. If this window class was previously entered (FIG. 18) program logic to handle the translation of the window exists. Screens (FIGS. 17–18) can also be displayed which will enable the user to associate with the displayed screen certain information such as the window class 170, name 172, function 174, DBCS style 176. As shown in FIG. 18 each window or screen may be assigned a classification according to the function of window being displayed. It is understood that the logic underlying the translation of screens are handled differently by the underlying program logic according to the function of that screen. Thus, the particular program logic is associated with each window at this time. Accordingly, the window class will identify to the program the type of logic that must be used to translate this child window. If so, the user will call that program logic and enter the window class translation function as shown in FIG. 10.

Figure 10:
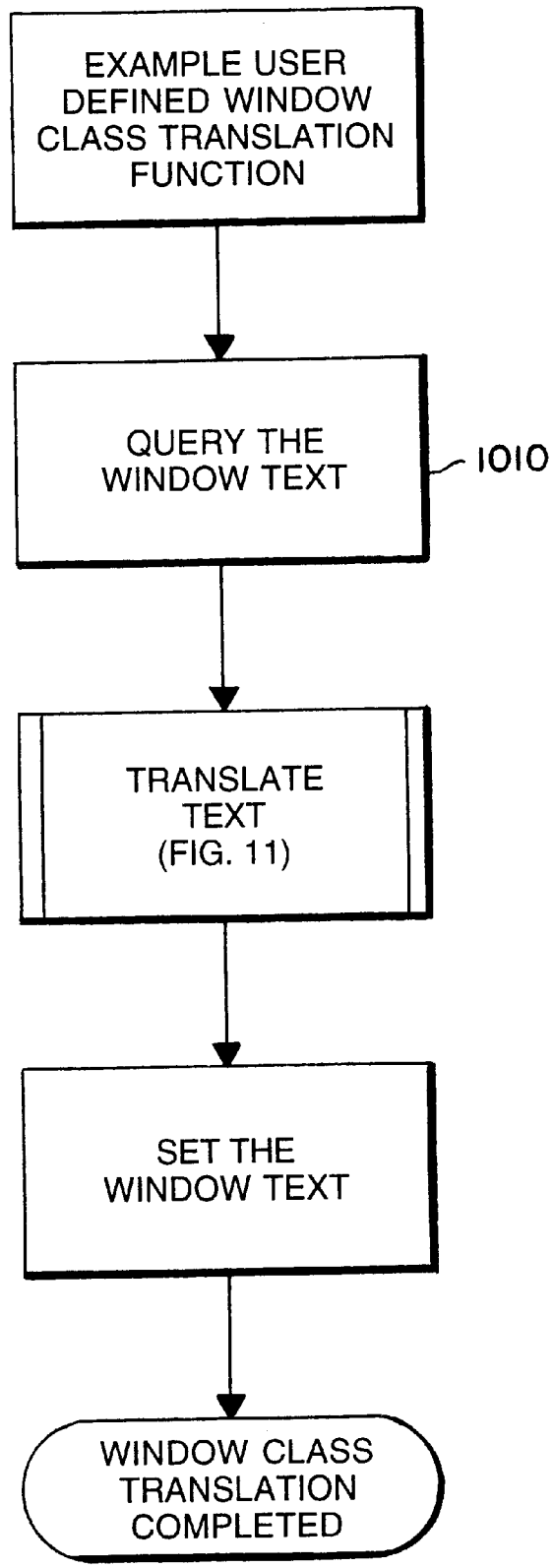
FIG. 10 is a flow diagram showing the translation of a window of the screen display, the window having a predetermined translation routine associated therewith.
Figure 11:
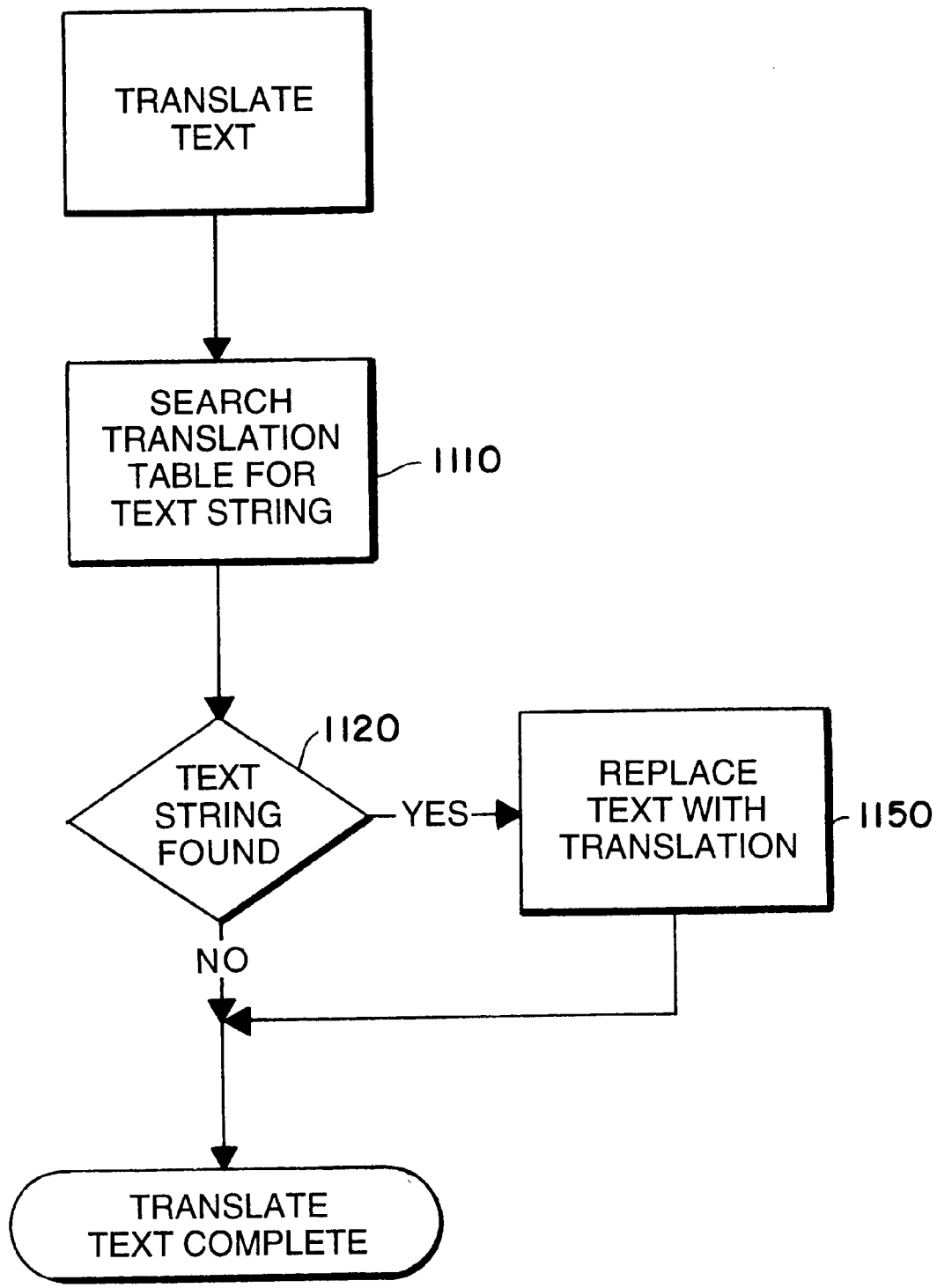
FIG. 11 is a flow diagram showing the translation text function.

FIG. 10 illustrates that the window text is queried 1010 and translated as shown in the FIG. 11 routine, it being understood that the logic utilized therein will vary according to the class of the child window. This text is then translated, set and returned.

Upon completion of the window position change handler routine (FIG. 5), the translated window messages are returned for subsequent display. This procedure will be accomplished for every window that is to be displayed at 320.

Figure 6:
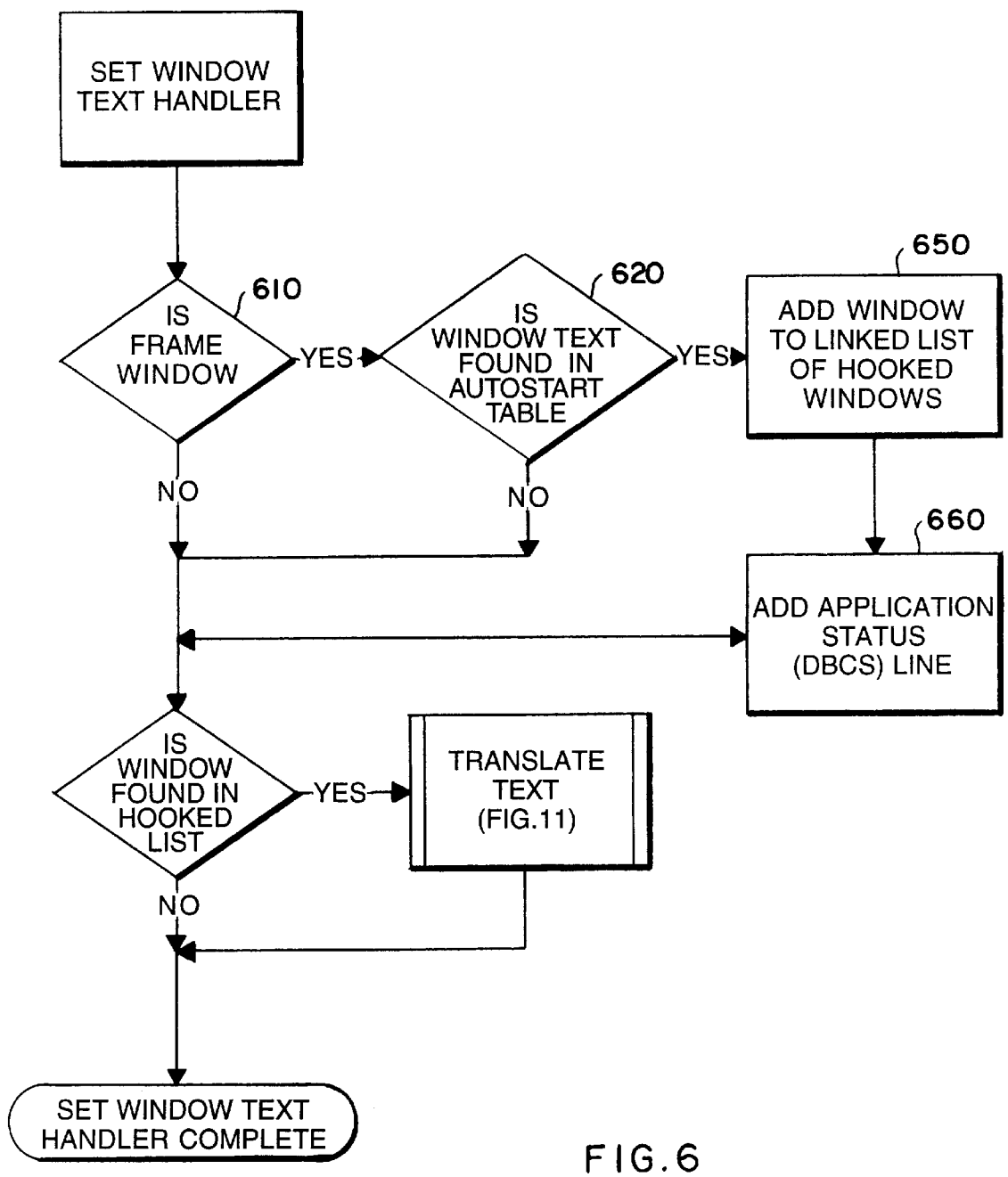
FIG. 6 is a flow diagram showing the handling of a set window text message.
Figure 7:
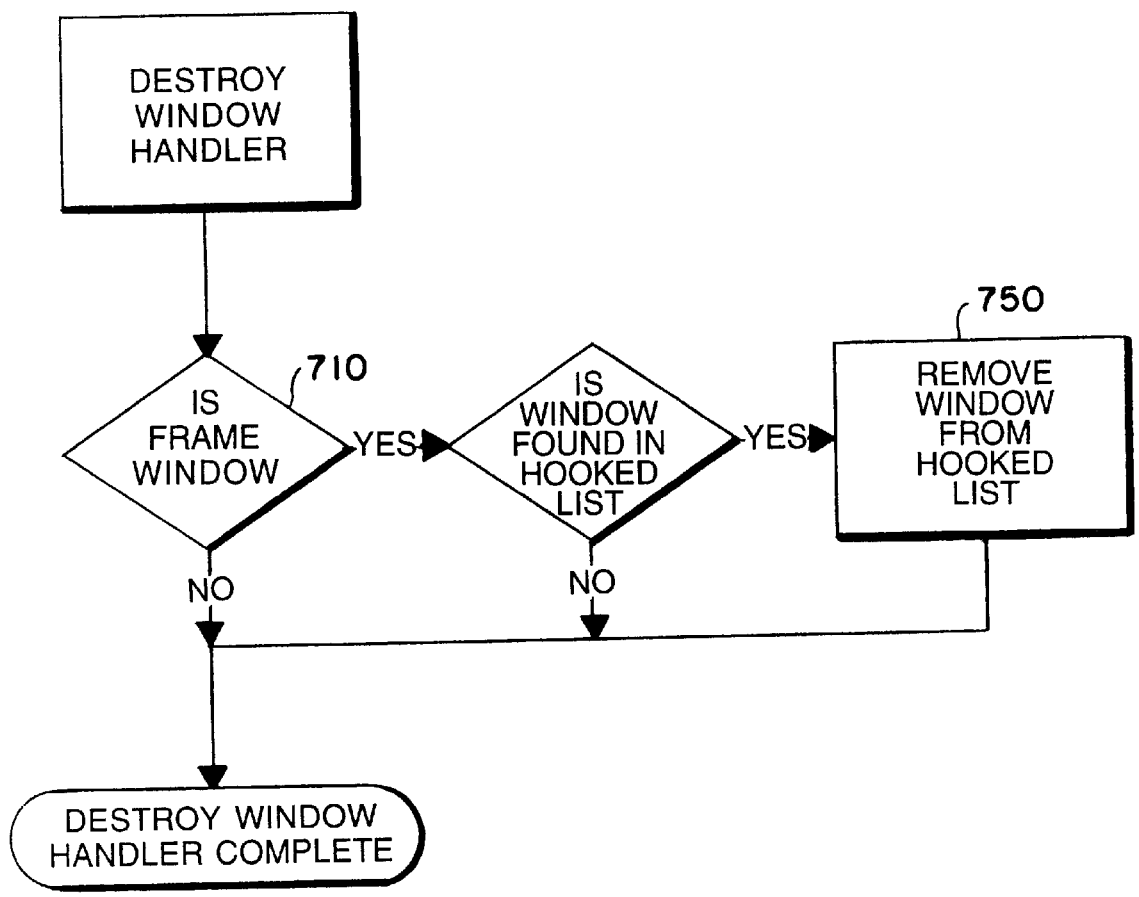
FIG. 7 is a flow diagram showing the handling of a destroy window text message.

A set window text message is shown at 330. If so, the set window text handler routine at FIG. 6 is utilized. This routine is utilized when the text of a previously created window is changed due to some type of action thereon by the user. For example, the window may display a push button ICON. Upon pushing the button, the text of the window may change. If so, a set window message is created corresponding to this new window display. If so, and if a frame window 610, translation tables in the auto start file are checked 620. If found, this particular window is added to the list of hooked windows at 650 with an application status line being added (if applicable) at 660. As this window is now found in the link list the text will be translated pursuant to the FIG. 11 routine.

If not a frame window a check is made to see if the window has been previously entered in the hook list. If so, the text is translated by the FIG. 11 translate routine and returned.

A destroy message may be received from the message queue. This is primarily a clean up routine (FIG. 7) of frame windows found in the stored hooked lists. Accordingly, the message is checked to see whether a frame window is incorporated therein at 710 and if so, whether such window is on the linked list at 720. If so, the window message is removed from the list at 750.

It is understood that this above process is performed upon start up of the application program. Accordingly, the hooked screen displays will be translated into the foreign language of the auto start file and translated.

Figure 12:
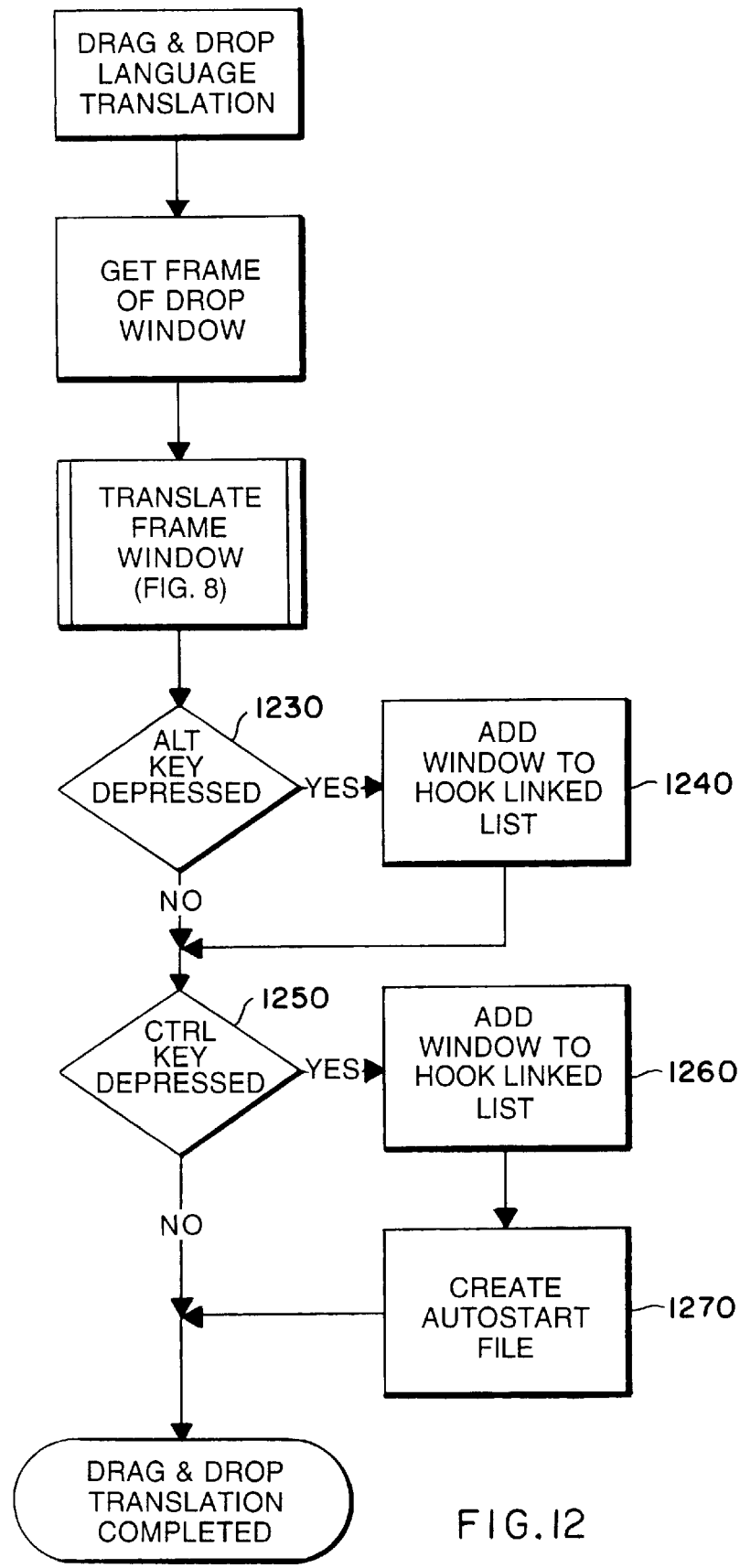
FIG. 12 is a diagram showing the translation of a window using the drop and drag option.

FIG. 12 illustrates a translation of displayed screen windows without the automatic start up process. For example, a second user application program may be displayed during the use of the first application program. However, the screen display of the second application program will not have been translated by the initial auto start up. Thus, the user may also wish to display such screen in the Spanish language. Alternatively, the user may wish to keep the screen in the host language and translate screens only upon demand. If so, the user mouses the Spanish book ICON and drags this ICON to the screen display. Upon dropping the ICON on the application window, the frame of the application window will be translated pursuant to the FIG. 8 routine. The window is added to the hooked link list for subsequent use by depression of the ALT key 1230, 1240. If the control key is depressed 1250, the window is added to the hooked link list 1260 and an auto start file can then be created 1270. Accordingly, upon wake up the second program the screen displays of the second program will also be translated to the Spanish language.

It is also understood that during use of the GUI translator that screen displays may be translated from the Spanish language to the host language or to any other language for which a foreign book ICON is available. It is noted that such foreign ICONS are only available if the above-described translation process has been effected.

For example, as shown in FIG. 22, the FIG. 21 Spanish screen may be translated into the Japanese language by the FIG. 12 routine. The mouse is placed on the Japanese book ICON 2090, dragged to this application screen and dropped (released) thereon. Thus, the subsequent screen, as shown in FIG. 22, will be displayed. This translation compares the displayed Spanish language to the basic language. Once the equivalent basic language is found the basic language is then found in the Japanese translation tables. Accordingly, it can be seen that our program enables user to translate the language of the host program into other languages which will enable the user to move back and forth between various languages. Of course, it is understood that the extent of the language translations which may be utilized may be limited by the available program memory.

It is understood that the above should enable one skilled in the art to write the accompanying program source code so as to effect the above method.

Although a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. A method of translating a selected screen display of an application software program operable by a computer operating system from a first language to a second language comprising the steps of:
 (a) creating a message having text therein for forming in a first language a selected screen display of an application program for display in a user-readable form on a terminal of a computer operating system;
 (b) selecting a second language;
 (c) displaying said message on said terminal in said readable form;
 (d) displaying on said terminal a table having a first column and a second column;
 (e) moving text from said displayed message on said terminal to said first column of said table;
 (f) user entering into said second column a translation of said text in said first column, said translation in said second language;
 (g) repeating steps (a)–(f) for each screen of the user application program selected to be translated from said first language to said second language;
 (h) saving said table in a computer memory;
 (i) selecting one of said created messages for terminal display;
 (j) searching said first column of said stored table for said text found in said first language in said selected message for terminal display;
 (k) modifying said selected message for terminal display by replacing said text of said selected message in said first language with said translated text in said second language found in said table;
 (l) displaying said modified message to present said screen display on said terminal;
 (m) repeating steps (i)–(l) for each selected message desired to be modified and displayed on said terminal in said second language.

2. The system as claimed in claim 1 wherein said step (f) of user entering said text in said second language is done via a keyboard in communication with said computer operating system.

3. The system as claimed in claim 1 wherein said step (e) of moving said text includes moving all text from said displayed message to said first column of said table.

4. The system as claimed in claim 1 further comprising a method for translating said text of said selected message for terminal display from a first language to a third language comprising the steps of:
 (n) selecting a third language;
 (o) displaying said selected message on said terminal in said readable form;
 (p) displaying on said terminal a second table having a first column and a second column;
 (q) moving text from said displayed selected message on said terminal to said first column of said second table;
 (r) entering into said second column of said second table a translation of said text in said first column from said first language to said third language;
 (s) repeating the steps (n)–(r) for each screen of the user application program desired to be translated from said first language to said third language;
 (t) saving said second table in a computer memory;
 (u) displaying on said terminal said selected message in a user-readable form in said second language;
 (v) searching said second column of said first table for said text found in said selected message in said second language;
 (w) extracting from said first column the text in said first language corresponding to said second language;
 (x) searching said first column of said second table for a match of said extracted text;
 (y) inserting said corresponding third language from said second table into said selected message upon a match of said first column text in said second table;

(z) displaying said selected message on said terminal in said third language.

5. A method of translating a selected screen display of an application software program operable by a computer operating system from a first language to a second language comprising the steps of:

(a) selecting a message created by a computer operating system corresponding to a selected screen display of an application program for display in a user-readable form on a terminal of the computer operating system, said message having text therein in a first language;

(b) selecting a second language;

(c) displaying said message on said terminal in said readable form;

(d) displaying on said terminal a table having a first column and a second column;

(e) moving text from said displayed message on said terminal to said first column of said table;

(f) user entering into said second column a translation of said text in said first column, said translation in said second language;

(g) repeating steps (a)–(f) for each screen of the user application program selected to be translated from said first language to said second language;

(h) saving said table in a computer memory;

(i) selecting a screen display corresponding to one of said messages in said table for terminal display in said second language;

(j) searching said stored table for said selected message corresponding to said selected screen display;

(k) modifying said selected message for terminal display by replacing said text of said selected message in said first language with said translated text in said second language found in said table;

(l) displaying said modified message to present said selected screen display on said terminal in said second language.

6. A method of translating a selected screen display of an application software program operable by a computer operating system from a first language to a second language comprising the steps of:

(a) selecting a message for use by a computer operating system having text therein for forming in a first language a selected screen display of an application program for display in a user-readable form on a terminal of the computer operating system;

(b) selecting a second language;

(c) displaying said message on said terminal in said readable form;

(d) displaying on said terminal a table having a first column and a second column;

(e) moving text from said displayed message on said terminal to said first column of said table;

(f) user entering into said second column a translation of said text in said first column, said translation in said second language;

(g) associating said table and said message in a computer memory;

(h) subsequently selecting said message for terminal display;

(i) finding said selected message in said first language in said computer memory;

(j) displaying said found selected message on said terminal in said second language by replacing said text in said first language with said translated text in said second language;

(k) repeating said steps (a)–(j) for each screen display desired to be displayed on said terminal in said second language.

\* \* \* \* \*